US012462908B1

(12) United States Patent
Henry

(10) Patent No.: US 12,462,908 B1
(45) Date of Patent: Nov. 4, 2025

(54) COMPUTER SYSTEMS AND METHODS FOR TEMPORARY, DISTRIBUTED LEDGER TECHNOLOGY (DLT) NETWORK STORAGE OF PERSONAL INFORMATION IN ADMINISTRATION OF DEFINED HEAL INSURANCE PLANS

(71) Applicant: The PNC Financial Services Group, Inc., Pittsburgh, PA (US)

(72) Inventor: R. Keith Henry, Port Saint Lucie, FL (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 412 days.

(21) Appl. No.: 18/313,106

(22) Filed: May 5, 2023

(51) Int. Cl.
*G16H 10/60* (2018.01)

(52) U.S. Cl.
CPC .................... *G16H 10/60* (2018.01)

(58) Field of Classification Search
CPC .............. G16H 10/00–65; G06Q 20/00–425
See application file for complete search history.

(56) References Cited

U.S. PATENT DOCUMENTS

| | | | |
|---|---|---|---|
| 8,670,993 B2 | 3/2014 | Henley | |
| 10,664,920 B1* | 5/2020 | Roll | G06Q 10/10 |
| 10,824,759 B1* | 11/2020 | Magerkurth | H04L 9/0894 |
| 11,250,937 B2 | 2/2022 | Malvankar et al. | |
| 11,443,838 B1 | 9/2022 | Cordonnier et al. | |
| 11,495,347 B2 | 11/2022 | De Armas | |
| 2010/0094663 A1* | 4/2010 | Spriggs | G06Q 10/1057 705/322 |
| 2014/0279638 A1 | 9/2014 | Raymond et al. | |
| 2019/0027237 A1 | 1/2019 | McFarlane | |
| 2020/0035339 A1 | 1/2020 | Eevani et al. | |
| 2020/0058381 A1 | 2/2020 | Patel | |
| 2020/0226285 A1 | 7/2020 | Bulleit et al. | |
| 2022/0245587 A1 | 8/2022 | Witchey | |
| 2023/0010836 A1 | 1/2023 | Jennings | |

OTHER PUBLICATIONS

Dorri et al., MOF-BC: A memory optimized and flexible blockchain for large scale networks, Future Generation Computer Systems (Mar. 2019), 92:357-373.

* cited by examiner

*Primary Examiner* — Mohammad A. Nilforoush
(74) *Attorney, Agent, or Firm* — K&L Gates LLP

(57) ABSTRACT

System administers defined contribution employee health insurance plans. Computing nodes of a DLT network are configured to, for each employee that registers a health care plan selection via an online exchange: (i) receive a transaction(s) that includes data indicative of the health care plan selection and personal information; (ii) store, encryptedly, on a distributed ledger of the DLT network, the transaction(s); and (iii) upon receipt of a notice that a health care insurance binder has been issued by a carrier for the plan, remove the certain personal information from the distributed ledger. A bank computer system administers an employer master account for the employer, which account includes a sub-account for each employee. The bank computer system is configured to: receive funds, via the employer, to fund premium payments for employees' plans; and pay the premium payments to the corresponding carriers.

14 Claims, 4 Drawing Sheets

Set-up

Ongoing

| $T_{ID}$ | $P.T_{ID}$ | Input | GV-hash1 | GV-hash2 | GV-PK+ | Sign |

FIGURE 3

COMPUTER SYSTEMS AND METHODS FOR TEMPORARY, DISTRIBUTED LEDGER TECHNOLOGY (DLT) NETWORK STORAGE OF PERSONAL INFORMATION IN ADMINISTRATION OF DEFINED HEAL INSURANCE PLANS

BACKGROUND

A Health Reimbursement Account (HRA) is a type of U.S. employer-funded health benefit plan that reimburses employees for out-of-pocket medical expenses and, in limited cases, for health insurance plan premium payments. Despite its name, an HRA is not truly an account because it does not place funds under a separate legal title. Instead, it is an agreement under which the employee can submit qualified health expenses to the employer for reimbursement. In January 2020, a new, tax-advantaged type of HRA became available to employers, called an "ICHRA" (Individual Coverage HRA). An ICHRA is a specific account-based health plan that allows employers to provide defined non-taxed reimbursements to employees for qualified medical expenses, including monthly premiums and out-of-pocket costs, such as copayments and deductibles. Employees must be enrolled in individual health insurance coverage to use the funds.

SUMMARY

In one general aspect, the present invention is directed to a system for administering defined contribution health insurance plans for employees of an employer. The system can include a health insurance exchange computer system, a distributed ledger technology (DLT) network, and a bank computer system. The health insurance exchange computer system may implement an online health insurance exchange through which eligible employees of the employer register, respectively, an individualized selection of a health care plan. Multiple health care plans, e.g., ICHRA plans, preferably are available on the online health insurance exchange, and such that each of the multiple health care plans has a corresponding carrier.

The DLT network is in communication with the health insurance exchange computer system. The DLT network includes a plurality of computing nodes, each being configured to, for each employee that registers a health care plan selection via the online health insurance exchange: (i) receive, from the health insurance exchange computer system, one or more transactions that include data indicative of the health care plan selection registered by the employee and personal information for the employee that is relevant to the health care plan selection; (ii) store, encryptedly, on a distributed ledger of the DLT network, the one or more transactions; and (iii) upon receipt of a notice that a health care insurance binder has been issued by the corresponding carrier for the employee for the health care plan selected by the employee, remove the certain personal information relevant for the employee from the distributed ledger.

The bank computer system is configured to administer an employer master account for the employer, where the employer master account includes a plurality of sub-accounts, such that each employee that registers a health care plan selection via the online health insurance exchange has a corresponding sub-account. On an ongoing basis during the coverage period(s) for the employees, the bank computer system is also configured to: receive funds, via the employer, to fund premium payments for the health care plans of the employees that register health care plan selections via the online health insurance exchange; and pay, electronically, the premium payments to the corresponding carriers associated with the health care plans selected by the employees via the online health insurance exchange.

In various embodiments, the system may further comprise a plan administrator computer system that is in communication with the DLT network and the bank computer system. The plan administrator computer system may be configured to, track the employees that registered health care plan selections via the online health insurance exchange. Based on tracking the employees that that registered health care plan selections via the online health insurance exchange, the plan administrator computer system can also be configured to transmit, electronically, to the bank computer system, data indicative of, for each employee that registers a health care plan selection via the online health insurance exchange: an identity of the employee; and payment information for the corresponding carrier associated with the health care plan selected by the employee via the online health insurance exchange.

Systems according to the present invention provide significant technical benefits. For example, storing the employees' health care plan selections on the DLT network makes the selections immutably verifiable. Also, personal information of the participating employees (and possibly their household members) is only stored temporarily on the distributed ledger. Also, in configurations according to the present invention, neither the bank computer system nor the plan administrator computer system stores the personal information of the employees (and their household members). That alleviates the bank computer system and the plan administrator computer system of the regulations governing storage of personal information. These and other benefits that can be realized through embodiments of the present invention will be apparent from the description that follows.

FIGURES

Various embodiments of the present invention are described herein by way of example in connection with the following figures.

FIG. 3 is diagram of a distributed ledger transaction format according to various embodiments of the present invention.

DESCRIPTION

Figure 1:
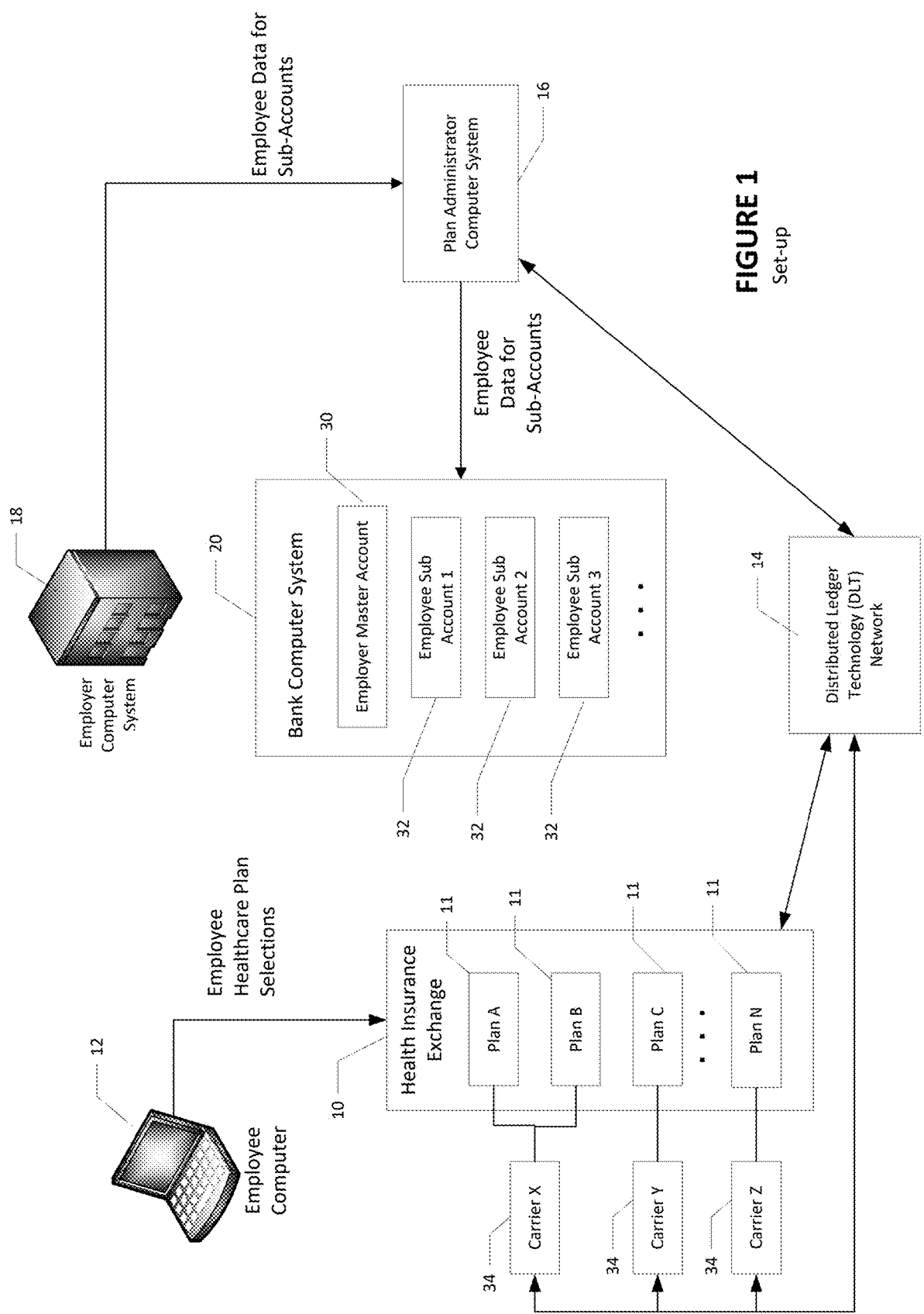
FIGS. 1 and 2 are diagrams of a system, including various computer systems, for administering defined contribution health insurance plans for employees of an employer, according to various embodiments of the present invention.

FIG. 1 is a diagram of an inter-networked set of computer systems for collectively establishing and administering defined health insurance plans, such as ICHRAs, for employees of an employer. The illustrated computer systems include a computer system for an online exchange (or marketplace) 10 through which employees of the employer can select their defined health insurance plans for a coverage time period (e.g., a calendar year); a distributed ledger technology (DLT) network 14; a plan administrator computer system 16 for an administrator that administers the healthcare plans of the employer; an employer computer system 18 for the employer; and a bank computer system 20 for a bank that receives funds from the employer and makes payments on behalf of the employees to the carriers associated with the particular healthcare plans selected by the employees via the exchange 10, as described herein.

Under an ICHRA, an employee (along with his/her household members) can select and enroll in individual health insurance coverage for a coverage time period (e.g., a calendar year). The employer reimburses the employee tax-free for the employee's insurance and/or medical expenses, including the employee's periodic premium payments for his/her selected plan. In various embodiments, the employee can select his/her health insurance coverage via the online health insurance exchange 10, which can be an online health insurance marketplace. That is, for example, the health insurance exchange 10 can be implemented by a computer system with one or more web servers, where an employee, from the employee's computer 12, logs into the exchange 10 to select one of the health insurance plans 11 offered via the exchange 10. Each plan 11 is associated with a carrier 34 (or insurance company) for the plan (see FIG. 2), although a single carrier 34 could offer multiple different plans to employees via the exchange 10, such as plans with different deductible levels, etc., as suggested by FIG. 1 with Carrier X being associated with Plans A and B on the exchange 10.

The employee computer device 12 may connect to the exchange 10 via an electronic data network, such as the Internet, to make his/her plan selection. The employee computer device 12 may be a laptop computer or a mobile device (e.g., smartphone or tablet), for example. A browser or other application running on the employee computer device 12 displays for the employee the insurance plans 11 available from the exchange 10 so that the employee can review and evaluate the plans to determine an appropriate plan for the employee (and his/her household members if also included in the plan). FIG. 1 shows only one employee computer device 12 for simplicity; in practice, multiple employee computer devices 12 may be in communication with the exchange 10 so that each of the multiple employees of the employer can make their individualized, respective healthcare plan selections.

With selection of a plan 11 by an employee on the exchange 10, the exchange 10 can also require the employee to enter personal information (e.g., "PII") of the employee (and/or his/her household members if applicable) that is relevant to health insurance in order for the associated carrier to provide the selected plan. The PII may include the employee's (and his/her household members') names, residential address, contact information, social security numbers, dates of birth, genders, primary care physicians and, in some cases, medications, as well as any past or present medical conditions.

Once the employee's health insurance coverage plan selection and relevant PII for the selected plan are captured, or registered, by the computers of the exchange 10, the exchange 10 can transmit the data (via an electronic data network, such as the Internet, LAN, WAN, etc.) to the distributed ledger technology (DLT) network 14. The DLT network 14 can be implemented as a decentralized, peer-to-peer network of computing nodes that employs distributed ledger technology, such as blockchain. The nodes (not shown) can, for example, validate the employee's plan selection and PII using, for example, specific validation rules that are set up for the DLT network 14 to validate the employee's selection and PII. The exchange 10 can publish the collected data, in encrypted form, to the DLT network 14 via an Application Programming Interface ("API"). The DLT network 14 can decrypt the received data and then store it, in an encrypted manner, as a blockchain transaction. The DLT network 14 can use SHA-265 encryption to store the transactions. The data published to the DLT network can be encrypted via, for example, asymmetric encryption cryptography, where the DLT network 14 has the private key. In other embodiments, symmetric encryption cryptography could be used.

A blockchain is a distributed ledger used to record transactions, such as in this case the employees' selections of their particular health care plans. The blockchain can include a series of data structures known as blocks each including a set of transactions. In blockchain storage, files (e.g., data files with the employees' selections and associated PII) can first be broken apart in a process called "sharding." Each shard is copied to prevent loss of data should an error occur during transmission. The files are also encrypted with a private key that makes it impossible for the files to be viewed by other nodes in the network. The replicated shards are distributed among decentralized nodes all over the network 14. The interactions are recorded in the blockchain ledger, allowing the system to confirm and synchronize the transactions across the nodes in the blockchain.

Each block can include a header with a hash derived from the contents of all the transactions in the block. A new block is inserted at the end of the blockchain by including a hash of the header of the last block in the chain in a previous block field in the header of the new block. This arrangement ensures that a change to the contents of a particular block in the chain will render the hashes in the previous block field incorrect for every subsequent block in the blockchain, thereby ensuring the consistency of the structure. The blockchain is generally published to computing nodes of entities participating in the DLT network 14. In various embodiments, the blockchain could be public or, more preferably, a permission-based private network. In a private blockchain, the blockchain is published only to entities participating in a private distributed transaction network. In either case, the participating entities, e.g., computing nodes of the exchange 14, the plan administrator computer system 16 (described further below), can verify new transactions simply by examining the contents of the blockchain.

The nodes are not required to know and/or trust each other and can be configured to perform specific roles in the network. For example, some nodes of the network can have, at least for a period of time as described below, a copy of the exact same data (e.g., each employee's health insurance coverage selection and his/her PII) in the form of a distributed ledger. If a node's ledger is altered or corrupted in any way, it can be rejected by a majority of the other nodes in the network.

An employee's selection and PII can be stored in different, separate transactions (or ledger entries) so that the transactions with the employee's PII can be removed later from the blockchain, as described herein, without destroying the immutability and veracity of the blockchain.

Upon an employee's selection being made, the exchange 10 can notify the relevant carrier 34 associated with the selected plan and transmit the employee's PII (in encrypted form) to the carrier 34. In other embodiments, the DLT network 14 could publish the employee's selection and PII (in encrypted form) to the carrier 34.

Upon receiving the employee's selection and PII, the carrier 34 may then issue a binder for the employee's health insurance. The binder can specify the employee's policy, the amounts and/or types of coverage, the effective date, the names of the insured parties, and any limits and/or deductibles for the policy. The binder can also include the premium payment schedule (e.g., the amounts and due dates for the premium payment) and payment information for carrier (e.g., Automated Clearing House "ACH" information for the carrier for premium payments to the carrier). Upon issuing the binder, the carrier 34 may also publish issuance of the binder to the DLT network 14. The binder publication from the carrier could be a copy of the binder itself, or just a conformation that the binder has been generated by the carrier 34. The applicable carrier 34 and/or the DLT network 14 can also transmit the employee's healthcare plan selection, but not necessarily the employee's PII, to the plan administrator computer system 16. The data sent to the plan administrator computer system 16 can include the employee's selected policy, the amount and/or type of coverage, the employee's premium payment schedule (amounts and due dates), and the payment information for the carrier. That way, the plan administrator computer system 16 can track which employees are enrolled for healthcare via the exchange 10, their premium payment schedules, and the payment (e.g., ACH) information for the carriers 34.

In various embodiments, once the binder is issued, the ledgers with employee PII can be removed from the blockchain using a "remove" transaction. For example, upon the carrier 34 publishing the binder notification to the DLT network 14 for a particular employee's plan selection, the exchange 10 can issue a transaction to remove that employee's PII from the blockchain ledger. FIG. 3 illustrates the format of a "remove" transaction according to various embodiments. $T_{ID}$ is the ID of the transaction, and $P.T_{ID}$ is the ID of the previous transaction in the ledger. The ID of the transaction to be removed (e.g., a transaction with an employee's PII) is stored in the "input" field. To remove a stored transaction, the user, i.e., the exchange 10, has to prove that it previously generated that transaction. To do so, the exchange 10 can include the hashes used to generate a Generator Verifier (GV), which can be a signed hash of a Generator Verifier Secret (GVS) that is a secret that is known only to the entity generating the transaction, in this case the exchange 10. Thus, to remove a transaction with an employee's PII, the exchange 10 can include the GVS and the $P.T_{ID}$ of the transaction to be removed and GV-PK+ in GV-hash1, GV-hash2, and GV-PK+, respectively, as shown in FIG. 3. GV-PK+ is the unique private key used by the GV. To prove that the exchange 10 knows the PK-corresponding to the GV-PK+, the exchange 10 can sign the remove transaction with this key and store it in a sign field. This remove transaction is subsequently broadcast to the network 14.

A "miner" of the DLT network 14 can be a node in the DLT network that stores transactions in the blockchain of the DLT network 14. In this case, the transactions can be the employees' selections of his/her healthcare plans and the associated PII of the employees (and their household members if applicable). On receipt of the remove transaction (say X), a miner in the DLT network 14 can first locate the transaction that is marked for removal in the input field of X (say Y) in the BC. Then, the miner verifies X by verifying that the generator of X knows the hashes and the key used for creating GV stored in Y. The GV in Y is preferably a signed hash, i.e., is in ciphertext, thus the miner first decrypts the GV using the provided GV-PK+ in X. Next, the miner verifies if the hash of the GVS and $P.T_{ID}$, extracted from GV-hash1 and GV-hash2 fields in X matches with the GV in Y. Finally, the miner can verify the signature in X using the GV-PK+. This ensures that the generator of X knows the corresponding GV-PK−. The verified transaction is mined into the BC. The removal of Y requires each miner to locate this transaction in the blockchain, which in the worst case incurs a delay of O (N) where N denotes the number of transactions in the blockchain.

In various embodiments, only the transactions with the employee's PII are removed from the blockchain's ledger. The transactions for the employees' selections of their health plans and the binders may be kept in the blockchain for immutable verification purposes. Such transactions need not include any PII of the employee. These transactions might include an ID for the employee, an ID for the selected plan, and/or a date stamp for when the employee made his/her selection via the exchange 14. Plus, these transactions are stored on the DLT network's blockchain in encrypted form. The transactions can also store an ID for the transaction (e.g., selection of a plan by an employee) and an ID for the employee device 12 (e.g., an IP address) used to make the selection.

For example, once the employee selects his/her plan via the exchange 10, the DLT network 14 and/or the exchange 10 can transmit the data, e.g., the transaction data and the employee's PII, to the respective carrier 34 for the plan. The carrier 34 can then generate the electronic insurance binder for the employee. Once the binder is generated, the carrier 34 can notify the DLT network and/or the plan administrator. Upon (i) the plan administrator 16 having received the data for an employee from the DLT network 14, and (ii) the binder being generated, the exchange 10 can be notified so that the exchange 10, in turn, can issue the transaction to the DLT network 14 to remove the employee's PII from the blockchain ledger as explained herein.

The plan administrator computer system 16 shown in FIG. 1 can be a computer system for a plan administrator of the employer's health care plans. The employer computer system 18 can send a list of employees of the employer eligible to sign up for a health care plan via the exchange 10. When an employee makes a health insurance plan selection via the exchange 10 that is verified by the DLT network 14, the DLT network 14 and/or the carrier 34 for the plan can publish the employee's selection transaction to the plan administrator computer system 16. The plan administrator computer system 16 can track the employees that have signed up for health care coverage via the exchange 14 up to an applicable deadline for the employees to sign up. The plan administrator computer system 16 can also store the premium payment schedules and carrier ACH payment information. The plan administrator computer system 16 can then forward to the bank computer system 20 data for the employees that have signed up for healthcare plans via the exchange 10. The data can include the identities of the employees that have signed up for plans and the carrier payment information for the plans so that the bank computer system 20 can make the periodic premium payments to the carriers 34 as described herein. The plan administrator computer system 16 may transmit this data to the bank computer system 20 via an electronic data network (e.g., the Internet) using Secure File Transfer Protocol (SFTP), for example.

The bank computer system 20 maintains an employer master account 30 for the employer. Funds from the employer for the employee's premium payments may be deposited in this account and used to pay the employees' premium payment for employees that signed up for plans via the exchange 10 as explained herein. The bank computer system 20 can also maintain sub-(or shadow) accounts 32 for each employee with a plan registered via the exchange 10. The bank computer system 20 knows which sub-accounts 32 to establish based on the data from the plan administrator computer system 16 about the employees that signed up for plans via the exchange 10. Preferably the sub-accounts 32 are not bank accounts that hold funds and, as such, do not incur banking fees (e.g., monthly checking fees). Instead the employee sub-accounts 32 preferably only track the amount of money in the employer master account 30 that is attributable to each respective employee. Conversely, the employer master account 30 is a bank account. The data from the plan administrator system 16 can also include payment information for the carriers 34 for the respective employee plans. The payment information may include ACH account information to which the bank can issue payments to the carriers, as described herein.

Figure 2:
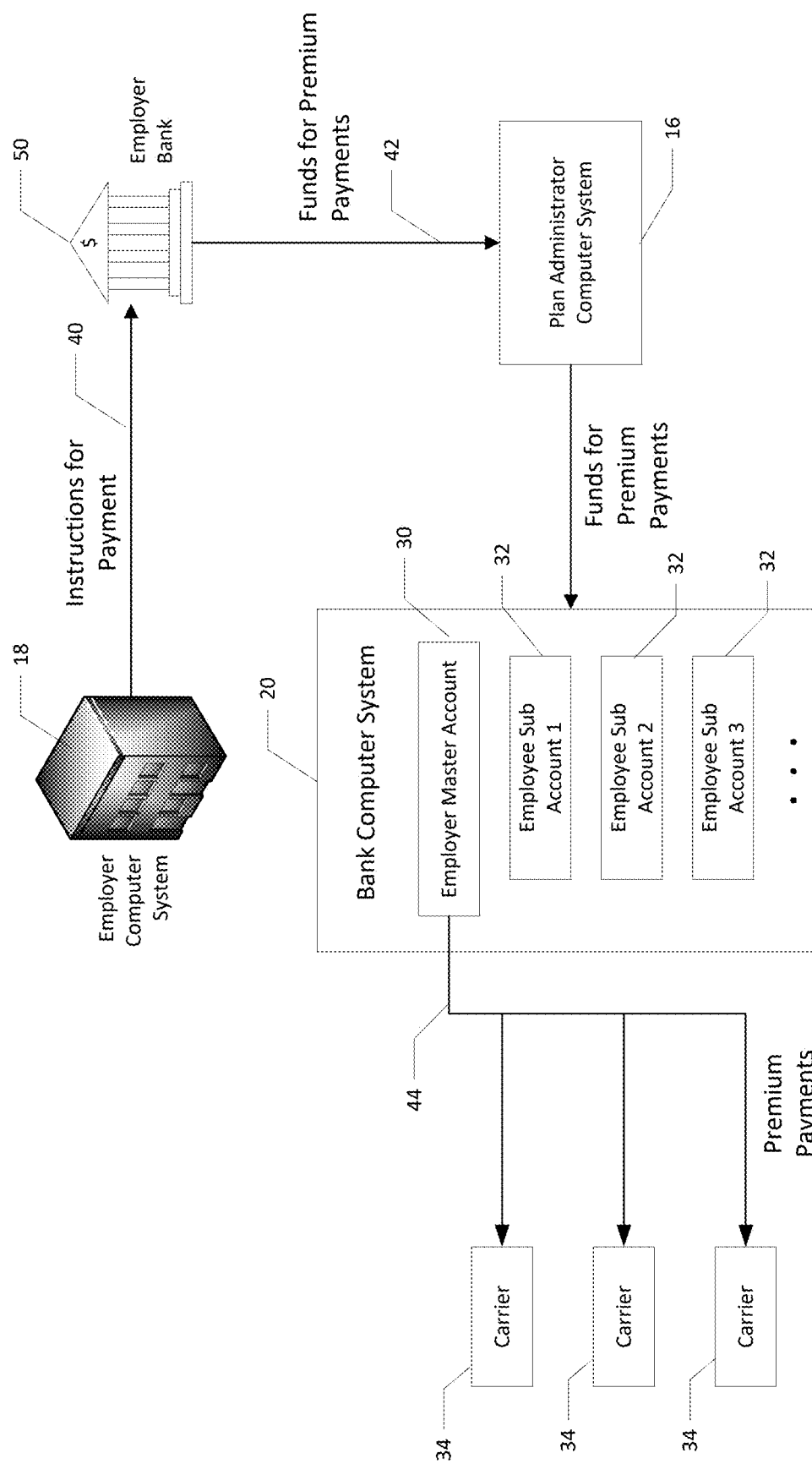

FIG. 2 depicts how the employees' healthcare plans are administered on an ongoing basis after setup according to various embodiments of the present invention. At step 40, the employer computer system 18 sends instructions electronically to its bank(s) 50 for the bank 50, at step 42, to transmit electronically (e.g., ACH) funds to the employer master account 30 via the plan administrator computer system 16. The bank 50 can issue the funds in response to instructions from the employer computer system 18 at step 40. The plan administrator computer system 16 can also transmit to the bank computer system 20 how much of the funds are attributable (or are to be allocated) to each employee. The data from the plan administrator computer system can also include the amount of the premium payment for each employee and payment information for the carriers. The bank computer system 20 deposits the funds in the employer master account 30 and adds to each employee's sub-account the portion of the funds attributable to each particular employee. The employer can have the funds transmitted coincidently with its pay periods for the employees. For example, if the employer pays its employees weekly, the employer can make the payments for the employee sub-accounts 32 weekly, etc.

At step 44, the bank computer system 20 can issue premium payments for the employees' healthcare plans, from the employer master account 30, to the carriers 34 for those plans. The bank computer system 20 can issue the payments according to the payment instructions received from the plan administrator computer system 16, which instructions can include the amount of each premium payment, the payment due date for each premium payment, and payment instructions for the carriers 34. Upon issuance of the payments, the bank computer system 20 can correspondingly deduct from the employee sub-accounts 32, for each employee, the applicable premium payment amount for the particular employee. The periodicity of the payments 44 from the bank computer system 20 to the carriers 34 may be different from the periodicity of the payments 42 from the employer bank 50 to the employer master account 30 (via the plan administrator computer system 16). For example, the payments 42 from the employer bank 50 may be weekly, whereas the payments 44 from the bank computer system 20 to the carriers 34 may be monthly. In that case, funds in the employer master account can earn interest.

As should be clear from the description above, the bank computer system 20 does not need to store the employees' PII or their healthcare plan selections. The bank computer system 20 can issue the premium payments 44 based on instructions about to whom to make the payments (i.e., the carriers), from whom (i.e., allocated to which employee sub-account 32), how much the payment is, and when it should be made. The employer computer system 18 also does not need to know or store the plan selections pertaining to each employee. The employer computer system 18 can issue the funds to be paid by the employer's bank 50 at step 40 based on information from the plan administrator computer system 16 about how much should be paid for the each employee, although the employer computer system may have PII of the employees for other reasons, such as for HR purposes.

The above description was generally presented in the context of a single employee of the employer. The process can be repeated for each employee that signs up for healthcare insurance via the exchange 10 during an enrollment period.

The electronic messages described herein, such as and including electronic messages sent to and from the DLT network 14, may be any suitable type of electronic message that can be sent over a computer network, can include packets, frames, datagrams, etc., and can be sent via APIs. In that connection, the various computer components described herein can communicate using any suitable network protocol, such as the Transmission Control Protocol (TCP), Internet Protocol (IP), Hypertext Transfer Protocol (HTTP), File Transfer Protocol (FTTP), or any other suitable network protocol. For example, the exchange 10 and/or carriers 34 can communicate with the DLT network 14 via APIs using any of these network protocols, including when it broadcasts messages to the DLT network 14.

The exchange 10, the bank computer system 20, the plan administrator computer system 16, and the employer computer system 18 can be implemented with one server or a network of servers. Each such server may comprise one or more processor cores and computer memories for storing software executed by the processor core(s). The program instructions (e.g., software) could be stored in a computer memory that is accessible by the processor cores, such as RAM, ROM, processor registers or processor cache, for example. Data may be shared between the various systems using suitable data links, such as data buses (preferably high-speed data buses) or network links (e.g., Ethernet).

The software for the various computer systems described herein and other computer functions described herein may be implemented in computer software using any suitable computer programming language such as. NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

Figure 4:
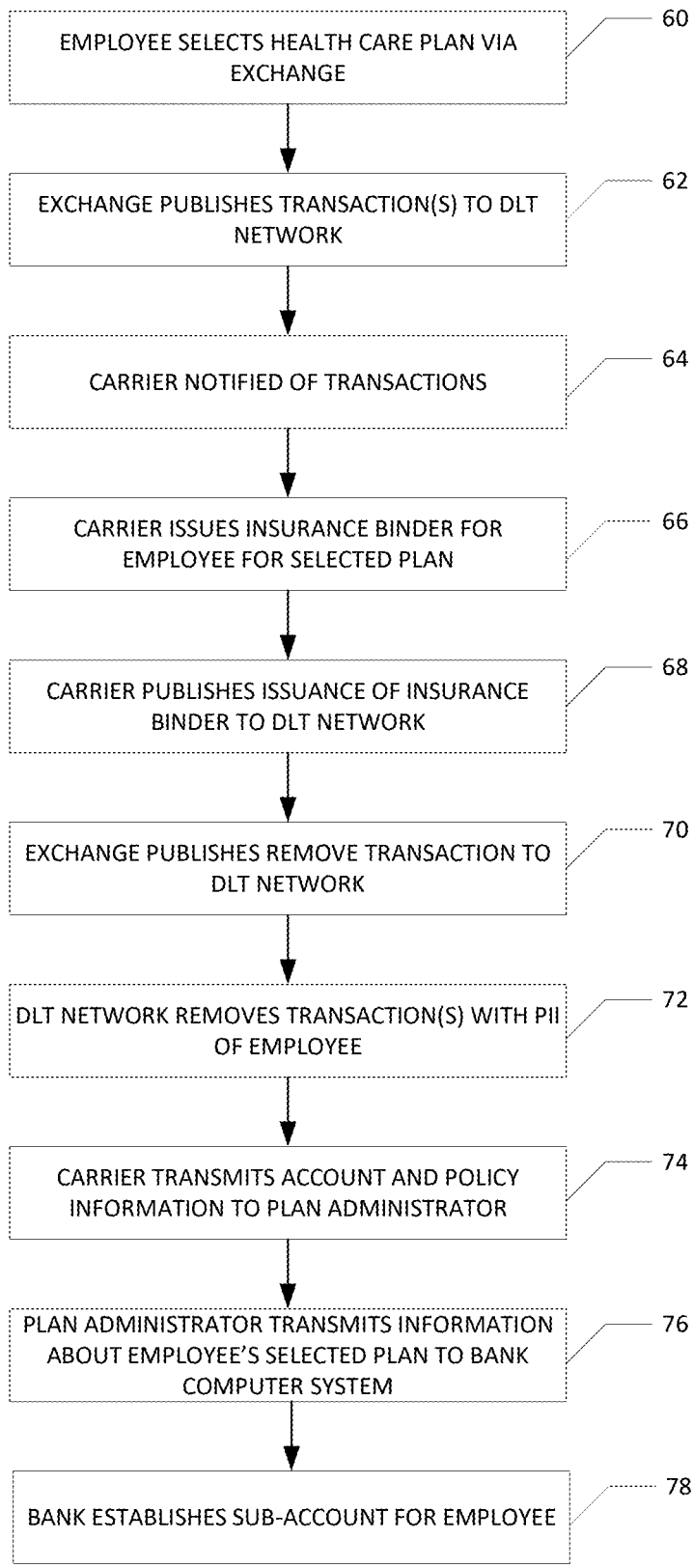
FIG. 4 is a flow chart illustrating a process flow of the system of FIGS. 1 and 2 according to various embodiments of the present invention.

FIG. 4 illustrates a process according to various embodiments of the present invention. At step 60, an employee of the employer selects one of the available health care plans that are available on the online exchange 10. At step 62, the exchange 10 publishes to the DLT network 14 one or more transactions confirming the employee's selection. The one or more transactions can include, for example, one transaction confirming the selection of the plan by the employee and another transaction with PII of the employee (and also possibly PII of household members of the employee). At step 64, the carrier 34 for the selected plan is notified of the transactions on the DLT network 14. The carrier 34 could subscribe to transactions on the DLT network involving selection of a plan offered by the carrier 34. The carrier 34 may receive the notification via an API from the DLT network 14.

At step 66, the carrier 34 issues an insurance binder for the employee for the employee's selected plan. At step 68, the carrier 34 publishes to the DLT network 14 that the insurance binder has been issued. In various embodiments, this step may also include publication of the insurance binder itself to the DLT network 14 for immutable verification purposes.

At step 70, in response to step 68, the exchange 10 can publish the "remove" transaction to the DLT network 14 to remove from the DLT network's distributed ledger any transactions with PII of the employee and/or his/her household members. To implement this step, for example, the exchange 10 may subscribe to transactions on the distributed ledger of the DLT network 14 related to issuance of the insurance binders by the carriers. In response to receiving such notification, the exchange 10 can issue the remove transaction. At step 72, the DLT removes the relevant transaction(s) as described above.

At step 74, the carrier 34 issues to the plan administrator 16 account information for the carrier and policy information for the employee's plan. The account information can include to where the premium payments should be made, e.g., ACH payment information for the carrier. The policy information can include a policy ID, the name of the employee and his/her household members covered by the plan if applicable, and premium payment information, such as the premium amounts and/or premium payment due dates.

At step 76, the plan administrator 16 transmits to the bank computer system 20 information about the employee's selected plan. This information can include, as described above, an identifier for the employee so that the bank computer system 20 can set up an employee sub-account 32 for the employee; ACH information for the carrier 34 that is receiving the premium payments from the bank (see step 44 of FIG. 2); and the premium payment schedule (e.g., due dates and amounts). In other embodiments, the premium payment information and/or carrier ACH information is only transmitted to the bank computer system 20 from the plan administrator computer system 16 at the time when the premium payments are to be made.

In various embodiments, steps 60 to 78 may be repeated whenever an employee signs up for a new plan via the exchange. In other embodiments, at step 74 the carrier 34 might send account and policy information for a batch of employees that sign up, or register, for plans of the carrier 34. Also, in various embodiments, the plan administrator at step 76 might send the plan information to the bank computer system 20 for a batch of employees that signed up for plans via the exchange 10, such as at the end of the applicable enrollment period. In such an embodiment, the bank computer system 20 can set up the employee sub-accounts 32 for all of the employees in the batch in response to receiving the information about the employees' plans from the plan administrator at step 76.

Following the process of FIG. 4, on an ongoing basis during the coverage period of the plans, the employer may fund (via the employer bank 50) the employer master account 30, from which the bank computer system 20 can issue the premium payments to the carriers 34, as described above, such as in connection with FIG. 2.

In various embodiments, therefore, the present invention is directed to a system for administering defined contribution health insurance plans for employees of an employer. The system may comprise a health insurance exchange computer system, a distributed ledge technology (DLT) network, and a banking computer system. The health insurance exchange computer system implements an online health insurance exchange through which eligible employees of the employer register, respectively, a health care plan selection of a health care plan, where multiple health care plans are available on the online health insurance exchange, and wherein each of the multiple health care plans has a corresponding carrier. The DLT network is in communication with the health insurance exchange computer system. It comprises a plurality of computing nodes, where the plurality of computing nodes are configured to, for each employee that registers a health care plan selection via the online health insurance exchange: receive, from the health insurance exchange computer system, one or more transactions, where the one or more transactions include data indicative of the health care plan selection by the employee and personal information for the employee that is relevant to the health care plan selection; store, encryptedly, on a distributed ledger of the DLT network, the one or more transactions; and upon receipt of a notice that a health care insurance binder has been issued by the corresponding carrier for the employee for the health care plan selected by the employee, remove certain personal information for the employee from the distributed ledger. The banking computer system is configured to: administer an employer master account for the employer, where the employer master account comprises a plurality of sub-accounts, such that each employee that registers a health care plan selection via the online health insurance exchange has a corresponding sub-account; receive funds, via the employer, to fund premium payments for the health care plans of the employees that register health care plan selections via the online health insurance exchange; and pay, electronically, the premium payments to the corresponding carriers for the health care plans selected by the employees via the online health insurance exchange.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for administering defined contribution health insurance plans for employees of an employer, the system comprising:
   a health insurance exchange computer system that implements an online health insurance exchange through which eligible employees of the employer register, respectively, a health care plan selection of a health care plan, wherein multiple health care plans are available on the online health insurance exchange, and wherein each of the multiple health care plans has a corresponding carrier;

a distributed ledger technology (DLT) network in communication with the health insurance exchange computer system, wherein:
- the DLT network comprises a plurality of computing nodes, wherein the plurality of computing nodes are configured to, for each employee that registers a health care plan selection via the online health insurance exchange:
  - receive, from the health insurance exchange computer system, one or more transactions, wherein the one or more transactions include data indicative of the health care plan selection by the employee and personal information for the employee that is relevant to the health care plan selection;
  - store, encryptedly, on a distributed ledger of the DLT network, the one or more transactions; and
  - upon receipt of a notice that a health care insurance binder has been issued by the corresponding carrier for the employee for the health care plan selected by the employee, remove certain personal information for the employee from the distributed ledger;

a banking computer system, wherein the banking computer system is configured to:
- administer an employer master account for the employer, wherein the employer master account comprises a plurality of sub-accounts, such that each employee that registers a health care plan selection via the online health insurance exchange has a corresponding sub-account;
- receive funds, via the employer, to fund premium payments for the health care plans of the employees that register health care plan selections via the online health insurance exchange; and
- pay, electronically, the premium payments to the corresponding carriers for the health care plans selected by the employees via the online health insurance exchange.

2. The system of claim 1, wherein the health insurance exchange computer system is configured to remove the certain personal information for the employee by, in response to receiving the notice that the corresponding carrier for the health care plan for the employee issued the insurance binder, issuing a remove transaction to the DLT network for the DLT network to remove a transaction from the distributed ledger with the certain personal information for the employee.

3. The system of claim 2, wherein the DLT network is configured to, in response to receiving the remove transaction, and as a prerequisite for removing the certain personal information relevant for the employee from the distributed ledger, verify that the health insurance exchange computer system issued the one or more transactions for the health care plan selection for the employee received by the DLT network.

4. The system of claim 1, further comprising a plan administrator computer system that is in communication with the DLT network and the bank computer system, wherein the plan administrator computer system is configured to:
- track the employees that registered health care plans selections via the online health insurance exchange; and
- based on tracking the employees that that registered health care plans selections via the online health insurance exchange, transmit, electronically, to the bank computer system, data indicative of, for each employee that registers a health care plan selection via the online health insurance exchange:
  - an identity of the employee; and
  - payment information for the corresponding carrier for the health care plan selected by the employee via the online health insurance exchange.

5. The system of claim 4, wherein the plan administrator computer system is configured to track the employees that registered health care plan selections via data transmitted to the plan administrator from the corresponding carriers.

6. The system of claim 4, wherein the plan administrator computer system is configured to track the employees that registered health care plan selections via data published to the plan administrator from the DLT network.

7. The system of claim 4, wherein, for each employee that selects a health care plan via the online health insurance exchange, the corresponding carrier for the health care plan transmits to the plan administrator computer system, payment instructions for the premium payments for the health care plan.

8. The system of claim 7, wherein the payment instructions comprise a policy ID for the health care plan, a premium payment amount, a due date for the premium payment, and account information for the carrier.

9. The system of claim 8, wherein:
- the plan administrator is configured to transmit the information relevant to the premium payments to the bank computer system; and
- the bank computer system is configured to pay the premium payments to the corresponding carriers in accordance with the payment instructions.

10. The system of claim 9, wherein, for each employee that selects a health care plan via the online health insurance exchange:
- the plan administrator computer system does not store the personal information relevant for the employee that is removed from the DLT network; and
- the bank computer system does not store the personal information relevant for the employee that is removed from the DLT network.

11. The system of claim 10, wherein the health insurance exchange computer system is configured to, in response to receiving the notice that the corresponding carrier for the health care plan for the employee issued the insurance binder, issue a remove transaction to the DLT network for the DLT network to remove a transaction from the distributed ledger with the personal information for the employee.

12. The system of claim 11, wherein the DLT network is configured to, in response to receiving the remove transaction, and as a prerequisite for removing the personal information relevant for the employee from the distributed ledger, verify that the health insurance exchange computer system issued the one or more transactions for the health care plan selection for the employee received by the DLT network.

13. The system of claim 12, where the DLT network is configured to verify that the health insurance exchange computer system issued the one or more transactions for the health care plan selection for the employee received by the DLT network by verifying, by the computing nodes of the DLT network, that the one or more transactions are signed by the health insurance exchange computer system based on a public encryption key.

14. The system of claim 1, wherein each of the multiple health care plans comprises an individual coverage health insurance account.

\* \* \* \* \*

UNITED STATES PATENT AND TRADEMARK OFFICE
CERTIFICATE OF CORRECTION

PATENT NO. : 12,462,908 B1
APPLICATION NO. : 18/313106
DATED : November 4, 2025
INVENTOR(S) : R. Keith Henry It is certified that error appears in the above-identified patent and that said Letters Patent is hereby corrected as shown below:

On the Title Page

Item (54), and in the Specification, Column 1, Lines 1-6, should read "COMPUTER SYSTEMS AND METHODS FOR TEMPORARY, DISTRIBUTED LEDGER TECHNOLOGY (DLT) NETWORK STORAGE OF PERSONAL INFORMATION IN ADMINISTRATION OF DEFINED HEALTH INSURANCE PLANS".

In the Specification

Column 2, Line 12, delete "on tracking the employees that that registered health care" and insert -- on tracking the employees that registered health care --.

Column 4, Line 3, delete "DLT network 14 can use SHA-265 encryption to store the" and insert -- DLT network can use SHA-256 encryption to store the --.

Column 5, Line 9, delete "conformation that the binder has been generated by the" and insert -- confirmation that the binder has been generated by the --.

Column 8, Line 22, delete "(HTTP), File Transfer Protocol (FTTP), or any other suitable" and insert -- (HTTP), File Transfer Protocol (FTP), or any other suitable --.

Column 10, Line 2, delete "system, a distributed ledge technology (DLT) network, and" and insert -- system, a distributed ledger technology (DLT) network, and --.

In the Claims

Column 11, Lines 65-66, delete "track the employees that registered health care plans selections via the online health insurance exchange:" and insert -- track the employees that registered health care Signed and Sealed this
Thirtieth Day of December, 2025

John A. Squires
*Director of the United States Patent and Trademark Office*

CERTIFICATE OF CORRECTION (continued)
U.S. Pat. No. 12,462,908 B1 plan selections via the online health insurance exchange; --.

Column 12, Lines 1-4, delete "based on tracking the employees that that registered health care plans selections via the online health insurance exchange, transmit, electronically, to the bank computer system, data indicative of, for each employee" and insert -- based on tracking the employees that registered health care plan selections via the online health insurance exchange, transmit, electronically, to the banking computer system, data indicative of, for each employee --.

Column 12, Lines 31-33, delete "relevant to the premium payments to the bank computer system; and the bank computer system is configured to pay the" and insert -- relevant to the premium payments to the banking computer system; and the banking computer system is configured to pay the --.

Column 12, Line 42, delete "the bank computer system does not store the personal" and insert -- the banking computer system does not store the personal --.

Column 12, Line 60, delete "13. The system of claim 12, where the DLT network is" and insert -- 13. The system of claim 12, wherein the DLT network is --.